(12) United States Patent
Ishimoto et al.

(10) Patent No.: US 7,709,044 B2
(45) Date of Patent: *May 4, 2010

(54) ACIDIC SOY PROTEIN GEL FOODS AND PROCESS FOR PRODUCING THE SAME

(75) Inventors: Kyoko Ishimoto, Izumisano (JP); Tsutomu Saito, Tsukuba-gun (JP); Toshio Kiriyama, Tsukuba-gun (JP); Eiji Iwaoka, Tsukuba-gun (JP); Masako Yoshida, Tsukuba-gun (JP)

(73) Assignee: Fuji Oil Company, Limited, Osaka (JP)

( * ) Notice: Subject to any disclaimer, the term of this patent is extended or adjusted under 35 U.S.C. 154(b) by 938 days.

This patent is subject to a terminal disclaimer.

(21) Appl. No.: 10/525,981

(22) PCT Filed: Aug. 28, 2003

(86) PCT No.: PCT/JP03/10895

§ 371 (c)(1),
(2), (4) Date: Feb. 28, 2005

(87) PCT Pub. No.: WO2004/019695

PCT Pub. Date: Mar. 11, 2004

(65) Prior Publication Data

US 2005/0238790 A1    Oct. 27, 2005

(30) Foreign Application Priority Data

Aug. 28, 2002 (JP) .............................. 2002-249054
Aug. 26, 2003 (JP) .............................. 2003-301089

(51) Int. Cl.
*A23L 1/20* (2006.01)

(52) U.S. Cl. ...................... 426/656; 426/549; 426/573; 473/414

(58) Field of Classification Search ................. 426/549, 426/573, 656; 473/414
See application file for complete search history.

(56) References Cited

U.S. PATENT DOCUMENTS

| 3,749,588 A | * | 7/1973 | Hunter ....................... 426/573 |
| 3,966,971 A | * | 6/1976 | Morehouse et al. ......... 435/272 |
| 4,957,764 A | | 9/1990 | Okonogi et al. |
| 5,597,607 A | | 1/1997 | Samoto et al. |
| 7,465,470 B2 | | 12/2008 | Saito et al. |
| 2001/0018197 A1 | | 8/2001 | Wong et al. |

FOREIGN PATENT DOCUMENTS

| CA | 2318566 C | * | 10/2004 |
| CN | 1058325 A | | 2/1992 |
| JP | 58-47451 | | 3/1983 |
| JP | 11-98960 | | 4/1999 |
| JP | 11-346668 | | 12/1999 |
| WO | 02/067690 | | 9/2002 |

\* cited by examiner

*Primary Examiner*—Lien T Tran
*Assistant Examiner*—Nikki H Dees
(74) *Attorney, Agent, or Firm*—Wenderoth, Lind & Ponack, L.L.P.

(57) ABSTRACT

The present invention is intended to provide acidic gel foods containing soybean protein to diversify means of taking soybean protein in daily eating habits. Using the acid-soluble soybean protein as specified in the description, an aqueous solution or an alcohol-containing aqueous solution of the protein is adjusted to pH 3 to 4.5. Then an acid having 2 or more acid groups per molecule or its salt or a salt of another acid is added thereto and the mixture is heated to form a gel. Thus, acidic gel foods including a jelly-like food favorable as a food can be obtained.

4 Claims, 2 Drawing Sheets

ACIDIC SOY PROTEIN GEL FOODS AND PROCESS FOR PRODUCING THE SAME

TECHNICAL FIELD

The present invention relates to foods containing soybean protein, particularly acidic gel foods, especially jelly-like gel foods containing soybean protein, which increases means of taking protein in eating habits, and to a process for producing the same.

BACKGROUND ART

Soybean protein has been utilized as an excellent source of food protein for a long time. In addition, since soybean protein has various functional properties such as emulsifying property and gel-forming property, it has been widely used as a food material or a food-improving material for edible meat products, fishpaste products, side dishes, bread, confectionery and a raw material for beverage. Further, it has been recently found that soybean protein reduces a blood cholesterol level and then its nutritional and physiological functions have been drawn attention.

Conventional means of positively taking soybean protein are "side dishes" such as tofu (soybean curd), fried tofu, natto (fermented soybeans) and the like. In addition, there is a type of soybean protein foods such as protein powder and a protein bar. However, these foods are all in the neutral range. There are no dessert foods with an acid pH, for example, a dessert prepared using a combination of soybean protein and fruit juice. Thus, means of eating soybean protein are limited. Among dessert foods, jelly can provide enjoyable mouth feeling and throat feeling and thus can provide an eating scene different from beverage.

Foods prepared by utilizing the gelation property of soybean protein include yuba (soybean curd skin) and frozen tofu in addition to the above-mentioned tofu, and they have been traditionally eaten for a long time. A gel of soybean protein has characteristics different from a gel of other protein materials derived from milk or eggs and a gel of polysaccharides such as carrageenan or agar in the mouth feeling, gel properties, nutrition and the like. However, traditional foods such as tofu are prepared by utilizing the gelation property of soybean protein in the pH range form neutral to lower acid (i.e. a pH above the isoelectric point of soybean protein) and at present there are no foods prepared by utilizing the gelation property of soybean protein in the acid range (below the isoelectric point), for example, gel dessert foods prepared using a combination of soybean protein and fruit juice.

Although soybean protein typically has an excellent gelation property in the neutral range, it does not exhibit the gelation property in the acid range. This is due to the following reason. Soybean protein dissolves in the neutral range and then exhibits the gelation property. On the other hand, at below pH 4.6, i.e. the pH range (pH 3.0 to 4.5) of so-called acidic foods (see the non-patent document 1), soybean protein hardly dissolves and then can not exhibit the gelation property. This is due to the pH of acidic foods equal to or in the vicinity of the isoelectric point (about pH 5) of soybean protein. Thus, many processed foods containing a high concentration of soybean protein which can provide soybean protein efficiently have been limited to foods with a neutral or slight acid pH as described above. Therefore, soybean protein foods prepared by utilizing the gelation property of soybean protein in the acid range are extremely expected to increase means of taking soybean protein and diversify soybean protein foods.

Many of conventional techniques relating to utilization of soybean protein for acidic foods are mainly directed to prevention of the aggregation and/or precipitation of soybean protein in the acid range in producing acidic beverages. For example, an addition of a stabilizer such as pectin (see the patent document 1), an addition of an emulsifier such as a sucrose fatty acid ester having an HLB of 13 or more (see the patent document 2), a method of suppressing the aggregation of soybean protein due to passing through the isoelectric point (see the patent document 3 and 4) and the like are known. However, these methods do not make the protein itself soluble. Thus, the soybean protein treated with these methods does not exhibit the functional properties of the protein itself such as the emulsifying property and the gel-forming property, let alone provide a clear gel, and thereby a type of foods for which these methods are used is limited. In addition, in order to minimize the aggregation of the protein due to passing through the isoelectric point, the concentration of the protein needs to be lower.

As described above, although soybean protein foods prepared by utilizing the gelation property of soybean protein in the acid range have been potentially in great demand, a method of allowing soybean protein to gelate in the acid range has not be found because of the poor solubility of soybean protein in the acid range and thus, to date such foods have been not produced.

The present invention is to provide gel foods of soybean protein, especially jelly-like foods, prepared by utilizing the gel-forming property of soybean protein in the acid range, which provide a variety of eating habits in taking nutritionally excellent soybean protein, and to provide a process for producing the same.

REFERENCES

Non-patent document 1: Ed. Isao SHIBASAKI, "Sakkin and/or Jokin Ohyo Handbook (Sterilization and/or Disinfection Application Handbook)", SCIENCE FORUM, 1985, p. 28;
Patent document 1: JP-A 54-52754;
Patent document 2: JP-B 59-41709;
Patent document 3: JP-A 7-16084;
Patent document 4: JP-A 2000-77;
Patent document 5: WO02/67690

DISCLOSURE OF INVENTION

The present inventors studied intensively and as a result, found that acidic gel foods containing a high concentration of soybean protein and having a high nutritional value and good mouth feeling were obtained by using the below-described acid-soluble soybean protein, the resulting gel was heat-irreversible, that is, not dissolved by heating again, and syneresis was not observed during freezing and thawing of the gel. They further studied the gelation condition such as the protein concentration, pH, the type and concentration of salts, heating temperature, heating time, additives and the like, and finally accomplished the present invention. The present invention relates to a process for producing acidic gel foods of soybean protein which comprises heating an acidic solution of an acid-soluble soybean protein in water or a mixture of water and alcohol as it is or after subjecting said solution to one or more of adjustment of pH, addition of a salt or an acid and addition of an anionic polymer, and to the gel foods thus obtained.

An acid-soluble soybean protein, when used in the present invention, refers to a soybean protein having a solubility of 80% or more at pH 3.0 to 4.5. A method of producing the acid-soluble soybean protein is not particularly limited. For example, a solution containing soybean protein is subjected to one or both of (a) removal or inactivation of polyanionic substances which are derived from the protein contained in the solution and (b) addition of a polycationic substance to the solution and then heated above 100° C. at pH below the isoelectric point of the protein to obtain the acid-soluble soybean protein. The solubility as used herein is determined by dispersing protein powder in water so that the protein concentration is 5.0% by weight, stirring thoroughly the dispersion, adjusting the pH if necessary, centrifuging the solution at 10,000 G for 5 minutes, and then determining the proportion of the supernatant protein in the total protein by a protein determination method such as Kjeldahl method or Lowry method.

Therefore, the present invention relates to:

(1) a process for producing acidic gel foods of soybean protein, which comprises heating a 4-20% by weight solution of an acid-soluble soybean protein in water or a mixture of water and alcohol with pH of 3.0-4.5 as it is or after subjecting said solution to any one or more of (A) adjustment of said solution to pH 3.0-4.5, (B) addition of an acid having two or more acid groups in one molecule or a salt thereof, (C) addition of a salt of an acid other than the acid used in (B), and (D) addition of an anionic polymer;

(2) the process for producing acidic gel foods of soybean protein according to the above (1), wherein the acid-soluble soybean protein has a solubility of 90% or more at pH 4.5 or lower;

(3) the process for producing acidic gel foods of soybean protein according to the above (1), wherein the amount of the acid or a salt thereof added in (B) is 0.1-10 mM;

(4) the process for producing acidic gel foods of soybean protein according to the above (1), wherein the amount of the salt added in (C) is 5-200 mM;

(5) the process for producing acidic gel foods of soybean protein according to the above (1), wherein the amount added of the anionic polymer is 2-30% by weight of the amount of the protein;

(6) the process for producing acidic gel foods of soybean protein according to the above (1), wherein the heating is carried out at 60° C. or more for 10 minutes or more; and (7) acidic gel foods which are obtained by the process according to any one of the above (1) to (6).

BEST MODE FOR CARRYING OUT THE INVENTION

Figure 1:
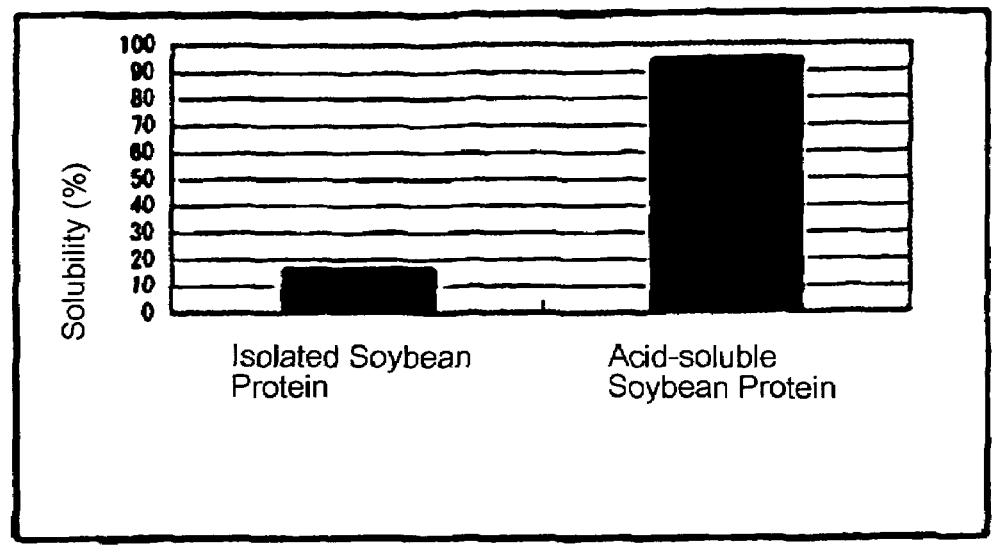
FIG. 1 is a graph showing the solubility of an acid-soluble soybean protein and an isolated soybean protein.

Hereinafter, preferred embodiments of the present invention will be described. An acid-soluble soybean protein used in the present invention may be any soybean protein having a solubility of 80% or more at pH 3.0 to 4.5.

The acid-soluble soybean protein is obtained, for example, by a method described in the above patent document 5. The method comprises subjecting a solution containing soybean protein to one or both of (a) removal or inactivation of polyanionic substances which are derived from the protein contained in the solution and (b) addition of a polycationic substance to the solution, adjusting the solution to pH 2.3-4.3 below the isoelectric point of the protein (i.e. more acid pH range than the isoelectric point), and then heating the solution above 100° C. After heating, the pH of the solution may be 4.5 or less. The solution may be dried to obtain powder and the powder may be then dissolved prior to use. The polycationic substance used in (b) includes chitosan. The removal or inactivation of polyanionic substances in (a) includes removal or inactivation of phytic acid. The removal or inactivation of phytic acid may be accomplished by, for example, one or both of treatment with phytase and addition of a divalent or more metal ion. The heating above 100° C. in the acid range below the isoelectric point of the protein may be carried out, for example, by a steam injection method.

By the above method, an acid-soluble soybean protein whose main component is globulin can be produced which has a solubility of 90% or more at pH 4.5 or lower, a transmittance (a 5% by weight protein solution) of 20% T or more at 600 nm and a 0.22M/TCA solubility of 20% or less. The transmittance (% T) as used herein is determined by dispersing protein powder in water so that the protein content is 5.0% by weight, stirring thoroughly the dispersion, adjusting pH if necessary, and then measuring the transmittance (% T) at 600 nm with a spectrophotometer (U-3210 autographic spectrophotometer manufactured by Hitachi Ltd.) using a 1 cm cell. The TCA solubility (%) is an index of the degradation of protein and determined by dispersing protein powder in water so that the protein content is 1.0% by weight, stirring thoroughly the dispersion and then determining the proportion of a 0.22 M trichloroacetic acid (TCA)-soluble protein in the total protein of the resulting solution by a protein determination method such as Kjeldahl method or Lowry method. However, as described above, the acid-soluble soybean protein used in the present invention is not limited particularly as long as it has a solubility of 80% or more at pH 3.0 to 4.5, and it is not limited by the transparency either.

The acid-soluble soybean protein molecules used in the present invention have positive surface charges in a solution having pH 4.5 or less because the pH is below the isoelectric point. Thus, electrostatically repulsive force due to the positive charges of the molecular surface acts between the molecules. Simultaneously, hydrophobic attractive force acts between the hydrophobic regions of the molecules. The gelation of the acid-soluble soybean protein is controlled by a balance between the electrostatically repulsive force and the hydrophobic attractive force. In other words, when the electrostatically repulsive force is reduced, the hydrophobic attractive force acts strongly and the protein molecules are entwined with each other to form a dimensional network of gel, which is heated to accomplish the gelation.

For reducing the electrostatically repulsive force, the pH of the solution may be adjusted close to the isoelectric point of the protein to reduce the positive charge on the molecular surface, or the ion strength of the solution may be increased to block the electric repulsive force. Adjustment of the pH of the solution or addition of a salt (except for "a salt of an acid having two or more acid groups in one molecule" described later) meet such objectives. In this regard, it is necessary to adjust the pH to 3.0 or more when the pH is lower than 3.0, but it is not always necessary to adjust the pH when the pH is 3.0-4.5. In order to obtain the desired gel properties, if necessary, the pH may be further adjusted within pH 3.0-4.5. It is more preferable to adjust the pH to pH 3.0-4.3 because even if the protein concentration is increased, the protein hardly aggregates within the pH range.

Alternatively, the protein molecules having positive charges may be bridged with an anion having two or more dissociated acid groups to effectively form a dimensional network of gel. This is accomplished by addition of an acid having two or more dissociated acid groups in one molecule or a salt thereof, or an anionic polymer. The anionic polymer may or may not have a gelating ability.

Another factor for gelation is the protein concentration in a solution. The more the protein concentration is increased, the more easily a dimensional network of gel is formed. Thus, a higher protein concentration facilitates the gelation of the protein and leads to a gel having a higher breaking load. For example, in the present invention, if a 12% protein solution with pH 3.0 is used, a gel having a breaking load of 25 gf/cm$^2$ or more can be obtained by heating the solution as it is. On the other hand, if a 5% protein solution with pH 3.0 is used, a gel can not be obtained by heating the solution as it is. In the latter case, a gel having 25 gf/cm$^2$ or more can be produced by adjusting the pH close to the isoelectric point, for example elevating close to pH 4.5 (the treatment A), or elevating the pH to 3.5 and adding sodium chloride so that the concentration is 100 mM (a combination of the treatment A and the treatment C), and then heating the solution. In other words, even if the protein concentration is low, the gelation is accomplished by carrying out at least one of the treatment (A), (B), (C) and (D). Optimum condition of each treatment required for the gelation varies depending on the protein concentration. Although the optimum condition also may vary slightly depending on a method for producing an acid-soluble soybean protein or a production lot, the gelation is promoted by each treatment as described above.

Hereinafter, the protein concentration and pH suitable for galation, and the amounts to be added of an acid having two or more acid groups in one molecule or a salt thereof, a salt of an acid other than the above acid, and an anionic polymer will be described. The protein concentration is 4-20% by weight of the solid content. Preferred is 6-18% by weight because gelation is easier. When the protein concentration is above 4%, a gel having a breaking load of 25 gf/cm$^2$ or more can be produced by carrying out at least one of the treatment (A) to (D). If the protein concentration is high, the viscosity of the protein solution increases. In such a case, the solution may be cut with a food cutter to produce paste and the paste may be defoamed and then heated. However, if the protein concentration is more than 20% by weight, the viscosity of the protein solution or paste is remarkably high and thereby the efficiency of subsequent work becomes poor.

In the treatment (B), the phrase "acid having two or more acid groups in one molecule or a salt thereof" can be clearly replaced by the phrase "acid or a salt thereof having two or more dissociated acid groups in one molecule" in a solution containing the protein of the present invention. As described above, the acid or salt has, so to speak, two or more negatively charged hands and via these hands positively charged proteins are linked (bridged) to each other to promote the gelation. Thus, at least two or more of acid groups need to be dissociated and negatively charged. When this phrase is expressed using numerical value, it is "an acid have a second dissociation constant (at 25° C.) pK$_2$ of 4 or less or a salt thereof".

The acid having two or more dissociated acid groups in one molecule or a salt thereof is not particularly limited as long as it can be used for food, and typically includes tripolyphosphoric acid, sulfuric acid, hexametaphosphoric acid, polyphosphoric acid, phytic acid and salts thereof. The amount to be added of the acid or a salt thereof is suitably 0.1-10 mM, more preferably 0.5-5.0 mM. For example, citric acid has three acid groups, but it has pK$_2$ of 4.3. Thus, only one acid group is dissociated from citric acid in the protein solution of the present invention, and citric acid dose not bridge between proteins and is not included in the above-described acid.

In the treatment (C), the concentration of a salt (except for "a salt of an acid having two or more dissociated acid groups in one molecule") suitable for gelation is 5-200 mM, more preferably 10-100 mM. If the concentration is higher than 100 mM, flavor from the salt is strong and the flavor needs to be improved. The salt used in (C) is not particularly limited as long as it can be used for food, excluding the salt of the above-described "acid having two or more dissociated acid groups in one molecule or a salt thereof". A usual salt such as sodium salt or potassium salt can be used as the salt. Its anion and cation are also not particularly limited. The salt may be a salt of weak acid or a salt of strong acid and includes sodium chloride, potassium chloride, sodium phosphate (pK$_2$ of phosphoric acid is 7.2) and the like. Especially, addition of a salt of weak acid has an effect of adjusting the pH of the solution to alkaline side. A salt of weak acid includes a salt of citric acid and a salt of gluconic acid.

In the treatment (D), the amount to be added of an anionic polymer suitable for gelation is 2-30% by weight, preferably 5-25% by weight based on 100% by weight of the protein. The optimum amount to be added of an anionic polymer varies depending on the type of said polymer. The anionic polymer is not particularly limited as long as it can be used for food, and preferably includes natural polymeric polyanions such as pectin and water-soluble soybean polysaccharides.

A solution of the acid-soluble soybean protein may be a solution in a mixture of water and alcohol. The alcohol content is 0.5-20% by weight, preferably 18% by weight or less and it is suitable for food. The alcohol is not particularly limited as long as it can be used for food and can dissolve the acid-soluble soybean protein. Therefore, any alcohol can be suitably used.

A solution of the acid-soluble soybean protein in water or a mixture of water and alcohol of the present invention includes an O/W type emulsion wherein the outer layer is water and the inner layer is oil. Therefore, an emulsion or alcohol-containing emulsion may be used in place of the solution. Oil contained in the emulsion or alcohol-containing emulsion is not particularly limited as long as it is edible. The amount of oil is also not particularly limited. However, in consideration of energy balance, the amount of oil corresponds to preferably 1-50%, especially 1-30% of the total energy. Emulsification may be carried out by a conventional homogenization method using a high pressure homogenizer or the like and at that time, an emulsifying agent may be used or the emulsifying ability of the acid-soluble soybean protein may be utilized without using an emulsifying agent. The emulsion thus obtained is cloudy, but it maintains the gelation property. An emulsified gel prepared from the emulsion is also cloudy and has characteristics of smooth feeling on the tongue and a light texture like mousse or bavarois.

Heating is carried out at 60° C. or more, preferably at 70° C. or more. The heating time is 10 minutes or more, preferably 20 minutes or more. A longer heating time leads to formation of a stronger gel having a bigger breaking load. However, in consideration of workability, the heating time is suitably 2 hours or less. The heating may be also retort heating. The gel thus obtained has a breaking load of 25 gf/cm$^2$ or more and has a shape-retaining property. By changing gelation condition, a gel having the desired texture including a soft texture like commercially available pudding, jelly, bavarois, silken tofu or the like and a resilient texture like mannan jelly, gummy or the like can be prepared according to the purpose.

The gel of the present invention is a so-called heat-set gel that is formed by heating, and is an irreversible gel that is not melted by heating again (boil heating or retort heating). Further, syneresis is not observed during freezing and thawing of the gel. In addition to such functional advantages, the gel is nutritionally preferred because it contains a high concentration of protein. These advantages are excellent characteristics, which are not found in generally known gelling agents, for example, heat-reversible gelling agents such as agar, carrageenan and gelatin.

Representative example of a protein material that is commercially available as food grade and is soluble in the acid range is milk whey protein. Milk whey protein is also gelated by heating in the acid range. However, compared with the gel prepared from the acid-soluble soybean protein of the present invention, a gel prepared from milk whey protein is weak and not resilient, even if it has the same protein concentration as the gel of the present invention. The gel of the acid-soluble soybean protein of the present invention is a novel gel of vegetable protein which has heat resistance and acid resistance and which can be prepared so as to have a variety of texture.

The gel foods of the present invention are produced by the gelation of the acid-soluble soybean protein itself, wherein the gelation particularly does not require a thickening agent or a gelling agent. Of course, a gelling agent such as agar or gelatin or a thickening agent such as locust bean gum or guar gum may be also used for the purpose of diversification of texture and the like. A feature of the present invention is that not opaque gel foods like tofu or pudding, but transparent gel foods like jelly are obtained by using a soybean protein having high solubility in the acid range, except in the case where the gel prepared according to the present invention is an emulsified gel containing oil. According to the present invention, however, gel foods having poor transparency like pudding can be also produced easily.

The gel of the present invention may contain a flavoring agent, fruit juice, sweetening, flavor and the like which are conventionally used for acidic food or beverage.

<Breaking Load>

In the present invention, a breaking load was measured by TexoGraph (Japan Food Research & Development Institute CO., LTD.) as an index of gel strength. Measurement was carried out using a cylindrical plunger with a diameter of 0.25 cm$^2$ for a gel having a thickness of 2 mm.

<Strain Rate>

In the present invention, a strain rate is expressed as the proportion of the thickness of a breaking point to the thickness of a sample and is an index of breaking resistance. A gel having a high strain rate is resilient and a gel having a low strain rate is fragile. A strain rate was measured by TexoGraph (Japan Food Research & Development Institute CO., LTD.) using a cylindrical plunger with a diameter of 0.25 cm$^2$ for a gel having a thickness of 2 mm.

<Gel Transmittance>

In the present invention, the transmittance (% T) of a gel was measured by placing a protein solution in a 1 cm cell before heating, heating it under a condition given in each example, and then measuring the transmittance of the resulting gel with a spectrophotometer at 600 nm.

<Phytic Acid Content>

The content of phytic acid and a salt thereof was determined by directly measuring the phytic acid content in a solution according to Alii Mohamed's method (Cereal Chemistry 63,475,1986).

Hereinafter, the embodiment of the present invention will be specifically illustrated by referring to Examples. However, the technical scope of the present invention is not limited to the Examples.

PREPARATION EXAMPLE

Acid-soluble Soybean Protein

Soybeans were compressed and the oil was extracted from the soybeans using n-hexane as an extraction solvent and then removed. To 5 kg of the resulting low-denatured defatted soybeans (nitrogen soluble index (NSI): 91), 35 kg of water was added. The mixture was adjusted to pH 7 with a diluted sodium hydroxide solution, extracted with stirring at room temperature for 1 hour and then centrifuged at 4,000 G to separate okara (bean curd lees) and insoluble matter from defatted soybean milk. The defatted soybean milk was adjusted to pH 4.5 with phosphoric acid and centrifuged at 2,000 G with a continuous centrifugal separator (decanter) to obtain an insoluble fraction (acid-precipitating curd) and a soluble fraction (whey). Water was added to the acid-precipitating curd so that the solid content was 10% by weight to obtain acid-precipitating curd slurry. The slurry was adjusted to pH 4.0 with phosphoric acid and then warmed to 40° C. To the resultant solution (phytic acid content: 1.96% by weight/solid content; TCA solubility: 4.6%) was added about 8 units/solid content of phytase ("Sumizyme PHY" manufactured by Shin Nippon Chemical Co. Ltd.) and the enzymatic reaction was carried out for 30 minutes. After completion of the reaction, the reaction mixture (phytic acid content: 0.04% by weight/solid content; TCA solubility: not changed substantially) was adjusted to pH 3.5, heated at 120° C. for 15 seconds with a continuous direct heat sterilization apparatus, and then spray-dried to obtain 1.5 kg of acid-soluble soybean protein powder. The protein had a solubility of 95% and a transmittance of 60% T. The acid-soluble soybean protein obtained in the preparation example was used for experiments of the following Examples.

EXPERIMENTAL EXAMPLE

The following experiments were carried out in order to examine an effect of each factor (protein concentration, pH, salt concentration, heating temperature, and heating time) on the gelation of soybean protein. Each gel sample was prepared from an aqueous solution of the acid-soluble soybean protein obtained in the preparation example by varying each factor within the range of solid content 8-16% by weight, pH 3.5-4.5 (adjusted with a 20% sodium hydroxide solution), salt concentration 0-150 mM, heating temperature 60-90° C., or heating time 10-90 minutes. A method of preparing a gel is shown in the following. For example, in order to prepare an aqueous acid-soluble soybean protein solution with a protein concentration of 8% by weight, pH 4.0 and a salt concentration of 50 mM, an aqueous acid-soluble soybean protein solution with a solid content of 8% by weight was adjusted to pH 4.0 with a 20% sodium hydroxide solution and thereto was added sodium chloride so that the concentration was 25 mM. After stirring until a uniform mixture was obtained, the mixture was heated at 80° C. for 30 minutes in a thermostatic chamber and cooled with flowing water to obtain a gel sample. Each gel sample was measured by the above-mentioned TexoGraph and the results were shown in Tables 1 to 5. These results show that increasing the protein solid content, adjusting pH close to the isoelectric point, or increasing the salt concentration leads to an increase of the gel strength (an elevation of the breaking load) and therefore promotion of gelation. When each factor is out of the range suitable for gelation, the aggregation of protein is observed. For example, increasing pH to the isoelectric point or increasing the salt concentration too much results in the aggregation of protein. In addition, synergistic effect is found when an increase of the protein concentration and the suitable conditions of the other factors are used in combination. The heating temperature may be 60° C. or more, preferably 70° C. or more. The heating time may be 10 minutes or more. As seen from the results, the breaking load keeps increasing at least for 90 minutes.

TABLE 1

Protein concentration and gel properties

| Protein concentration % | PH | Salt concentration mM | Temperature ° C. | Time min | Breaking load gf/cm$^2$ | Strain rate % | Transparency |
|---|---|---|---|---|---|---|---|
| 8 | 3.5 | 25 | 80 | 30 | 8 | 60 | T |
| 10 | ↑ | ↑ | ↑ | ↑ | 85 | 70 | T |
| 12 | ↑ | ↑ | ↑ | ↑ | 204 | 71 | T |
| 14 | ↑ | ↑ | ↑ | ↑ | 352 | 69 | T |
| 16 | ↑ | ↑ | ↑ | ↑ | 493 | 61 | T |

TABLE 2 pH and gel properties

| Protein concentration % | PH | Salt concentration mM | Temperature ° C. | Time min | Breaking load gf/cm$^2$ | Strain rate % | Transparency |
|---|---|---|---|---|---|---|---|
| 8 | 3.5 | 50 | 80 | 30 | 26 | 46 | T |
| ↑ | 3.75 | ↑ | ↑ | ↑ | 58 | 48 | T |
| ↑ | 4.0 | ↑ | ↑ | ↑ | 120 | 43 | T/C |
| ↑ | 4.5 | ↑ | ↑ | ↑ | 147 | 40 | C |
| ↑ | 4.75 | ↑ | ↑ | ↑ | Aggregation | | C |

TABLE 3

Salt concentration and gel properties

| Protein concentration % | PH | Salt concentration mM | Temperature ° C. | Time min | Breaking load gf/cm$^2$ | Strain rate % | Transparency |
|---|---|---|---|---|---|---|---|
| 8 | 3.75 | 0 | 80 | 30 | Breaking point is not detected | | T |
| ↑ | ↑ | 25 | ↑ | ↑ | 26 | 40 | T |
| ↑ | ↑ | 50 | ↑ | ↑ | 58 | 48 | T |
| ↑ | ↑ | 75 | ↑ | ↑ | 108 | 51 | T/C |
| ↑ | ↑ | 150 | ↑ | ↑ | Aggregation | | C |

TABLE 4

Heating temperature and gel properties

| Protein concentration % | PH | Salt concentration mM | Temperature ° C. | Time min | Breaking load gf/cm$^2$ | Strain rate % | Transparency |
|---|---|---|---|---|---|---|---|
| 9 | 3.75 | 50 | 60 | 30 | 36 | 50 | T |
| ↑ | ↑ | ↑ | 70 | ↑ | 64 | 54 | T |
| ↑ | ↑ | ↑ | 80 | ↑ | 66 | 53 | T |
| ↑ | ↑ | ↑ | 90 | ↑ | 62 | 51 | T |

TABLE 5

Heating time and gel properties

| Protein concentration % | PH | Salt concentration mM | Temperature ° C. | Time min | Breaking load gf/cm$^2$ | Strain rate % | Transparency |
|---|---|---|---|---|---|---|---|
| 9 | 3.75 | 50 | 80 | 10 | 63 | 48 | T |
| ↑ | ↑ | ↑ | ↑ | 30 | 65 | 50 | T |
| ↑ | ↑ | ↑ | ↑ | 60 | 72 | 55 | T |
| ↑ | ↑ | ↑ | ↑ | 90 | 90 | 53 | T |

Evaluation of Transparency

T: Transparent, Transmittance of 10% T or more

T/C: Translucence, Transmittance of 1% T to less than 10% T

C: White turbidity, Transmittance of less than 1% T

EXAMPLE 1

High Concentration Gel

The acid-soluble soybean protein obtained in the above preparation example was cut with a food cutter to prepare paste with a solid content of 14% by weight. To the paste, 0.03% of Sucralose (San-Ei Gen F.F.I., Inc.) and 0.2% of orange flavor (International Flavors & Fragrances Inc.) were added and the mixture was homogenized and defoamed. The mixture was put in a heat-resisting container, and then heated at 80° C. for 30 minutes in a thermostatic chamber. The resulting gel food was clear and the texture was suitably resilient and desirable.

EXAMPLE 2 pH Adjustment and Addition of a Salt

An aqueous solution (solid content: 9% by weight) of the acid-soluble soybean protein obtained in the above preparation example was adjusted to pH 3.75 with a 20% sodium hydroxide solution and thereto sodium chloride was added so that the concentration was 50 mM. To the mixture, 0.03% of Sucralose (San-Ei Gen F.F.I., Inc.) and 0.2% of blueberry flavor (International Flavors & Fragrances Inc.) were added. The mixture was stirred to obtain a uniform mixture, put in a heat-resisting container, and then heated at 80° C. for 30 minutes in a thermostatic chamber. The resulting gel food had a transmission of 40% T and was clear. The gel food can be spooned and had a sufficient shape-retaining property and suitable resilience.

EXAMPLE 3

Addition of a Salt of Weak Acid

An aqueous solution (solid content: 12% by weight) of the acid-soluble soybean protein obtained in the above preparation example was adjusted to pH 4 with sodium citrate and thereto 0.02% of Sucralose (San-Ei Gen F.F.I., Inc.) and 0.2% of muscat flavor (International Flavors & Fragrances Inc.) were added. The mixture was stirred to obtain a uniform mixture, put in a heat-resisting container, and then heated at 80° C. and for 1 hour in a thermostatic chamber to obtain a gel having a breaking load of 120 gf/cm$^2$.

EXAMPLE 4

Addition of an Acid Having Two or More Acid Groups in One Molecule

An aqueous solution (solid content: 9% by weight) of the acid-soluble soybean protein obtained in the above preparation example was adjusted to pH 4 with a 20% sodium hydroxide solution and then divided into two equal parts. To one part was added sodium hexametaphosphate (KISHIDA CHEMICAL CO., LTD) so that the concentration was 1.4 mM. To the other part was added a 50% phytic acid solution (KISHIDA CHEMICAL CO., LTD) so that the concentration was 1.0 mM. Each mixture was stirred to obtain a uniform mixture, put in a heat-resisting container, and then heated at 80° C. for 1 hour in a thermostatic chamber to obtain a gel having a breaking load of 90 gf/cm$^2$ in the former case or a gel having a breaking load of 95 gf/cm$^2$ in the latter case. The both resulting gels were clear and had suitable resilience.

EXAMPLE 5

Addition of a Polyanion

To an aqueous solution (solid content: 7% by weight; pH 3.5) of the acid-soluble soybean protein obtained in the above preparation example was added a water-soluble soybean polysaccharide which is an anionic polymer (SOYAFIBE; FUJI OIL CO., LTD) so that the concentration was 0.15%. The mixture was stirred to obtain a uniform mixture, put in a heat-resisting container, and then heated at 80° C. for 1 hour in a thermostatic chamber to obtain a gel having a breaking load of 90 gf/cm$^2$. The resulting gel was clear and had suitable resilience and the desirable texture.

EXAMPLE 6

Addition of a Salt of Weak Acid (Change of pH by Heating)

To an aqueous solution (solid content: 5% by weight; pH 3.5) of the acid-soluble soybean protein obtained in the above preparation example was added calcium citrate so that the concentration was 20 mM. The mixture was stirred. At that time, the added calcium citrate remained insoluble as white precipitates. The mixture was put in a heat-resisting container and then heated at 80° C. for 1 hour in a thermostatic chamber to obtain a gel having a breaking load of 27 gf/cm$^2$. The resulting gel had pH 4.3 because the calcium citrate was dissolved by heating and then the pH was elevated. The resulting gel was clear, can be spooned, and had a sufficient shape-retaining property.

EXAMPLE 7

Emulsified Gel

A mixture of 12% by weight of the acid-soluble soybean protein obtained in the preparation example, 12% by weight of palm oil, 0.2% by weight of yogurt flavor, and 0.01% by weight of Sucralose (San-Ei Gen F.F.I., Inc.) was emulsified by mixing with a food cutter. The resulting emulsion (pH 3.5) was defoamed, put in a heat-resisting container and then heated at 80° C. for 30 minutes in a thermostatic chamber to obtain a cloudy gel having a breaking load of 125 gf/cm$^2$. The gel had a smooth mousse-like preferred texture.

EXAMPLE 8

Alcohol-containing Gel

Into commercially available white wine (alcohol content: 11-12%) was dissolved the acid-soluble soybean protein obtained in the above preparation example so that the protein solid content was 9% by weight. The solution was adjusted to pH 3.9 with a 20% sodium hydroxide solution and thereto was added 0.03% of Sucralose (San-Ei Gen F.F.I., Inc.). The mixture was put in a heat-resisting container and then heated at 80° C. for 1 hour in a thermostatic chamber. The resulting gel maintained the transparency of white wine and therefore was clear. The texture was suitably resilient and fragile, and therefore it was desirable.

EXAMPLE 9

Combination Use of a Polysaccharide

Using the acid-soluble soybean protein obtained in the preparation example, as described in the above experimental example, a protein solution with a protein solid content of 9% by weight, pH 3.75 and a sodium chloride concentration of 50 mM was prepared. The solution was divided into two equal parts. To one part was added 0.4% of locust bean gum (San-Ei Gen F.F.I., Inc.) and to the other part was added 0.6% of Glucomannan (Reox RS Shimizu Chemical Corporation). Each mixture was stirred thoroughly to obtain a solution. The solution was put in a heat-resisting container and then heated at 80° C. and for 30 minutes in a thermostatic chamber. The both resulting gel foods were clear similarly to a gel not containing a polysaccharide obtained in the experimental example. The resulting gel containing locust bean gum had a breaking load of 103 gf/cm$^2$ and a strain rate of 73%. The gel containing Glucomannan had a breaking load of 112 gf/cm$^2$ and a strain rate of 65%. The Both gels had increased resilience and hardness compared with the gel food obtained in the experimental example (breaking load: 66 gf/cm$^2$; strain rate: 53%). The gel containing locust bean gum could be more pleasantly bitten off. On the other hand, the gel containing Glucomannan had a slightly glutinous rice cake-like texture. Thus, the texture of a gel could be changed by adding a polysaccharide.

EXAMPLE 10

Addition of Sugar

The acid-soluble soybean protein obtained in the above preparation example was cut with a food cutter to prepare paste with a solid content of 14% weight. To the paste, 16% of Glucose-Fructose Syrup (Nihon Cornstarch corporation) and 0.2% of orange flavor were added. The mixture was homogenized, defoamed, put in a heat-resisting container, and then heated at 80° C. for 30 minutes in a thermostatic chamber. The resulting gel food had a breaking load of 461 gf/cm$^2$ and a strain rate of 71%. The gel was resilient and could be pleasantly bitten off compared with the gel food obtained in Example 1 (breaking load: 352 gf/cm$^2$; strain rate: 69%). The gel became clearer by adding sugar.

COMPARATIVE EXAMPLE 1

Commercially Available Isolated Soybean Protein

Figure 2:
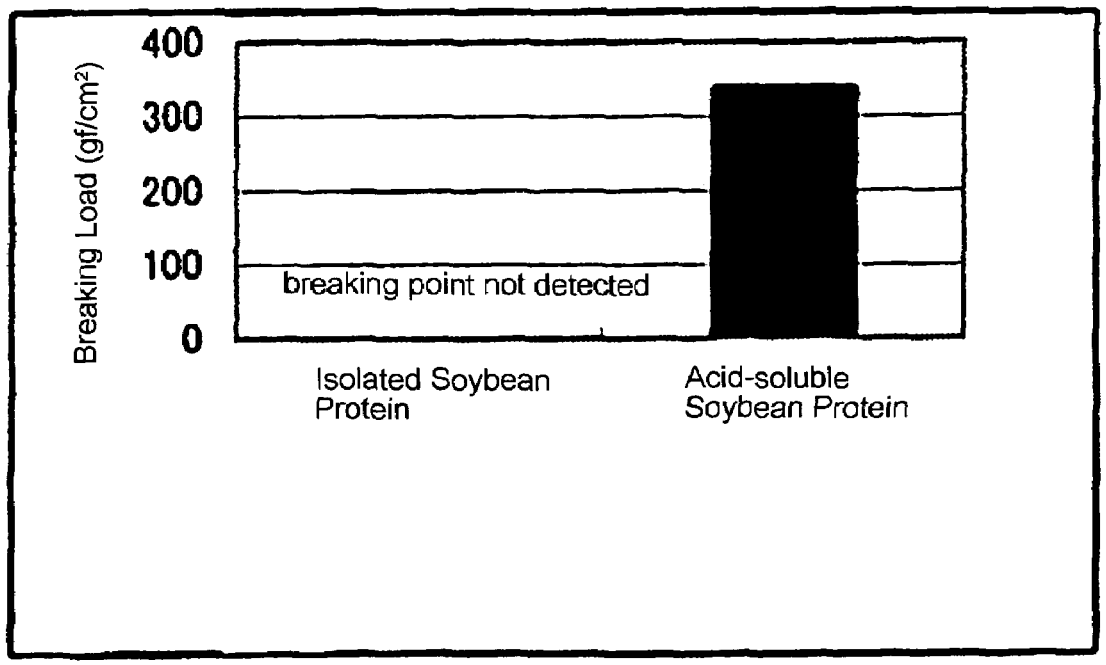
FIG. 2 is a graph showing the gel-breaking loads of an acid-soluble soybean protein and an isolated soybean protein.

The solubility of a commercially available isolated soybean protein (FUJIPRO E; FUJI OIL CO., LTD) under acid condition and the breaking load of a gel of the protein were measured. The isolated soybean protein and water were mixed with a food cutter and then defoamed to obtain paste with a solid content of 14% by weight. The paste was adjusted to pH 3.5 with phosphoric acid. The paste was put in a casing tube and then heated at 80° C. for 30 minutes in a thermostatic chamber to obtain a gel. The results are shown in FIG. 1 and FIG. 2. The solubility of the isolated soybean protein was low, 17%. The resulting gel was weak gel whose breaking point could not be detected. Even when the soybean protein solution was adjusted within pH 3.0-4.5 or 200 mM of sodium chloride was added to the solution, the protein did not gelate or aggregated.

COMPARATIVE EXAMPLE 2

Commercially Available Whey Protein

Figure 3:
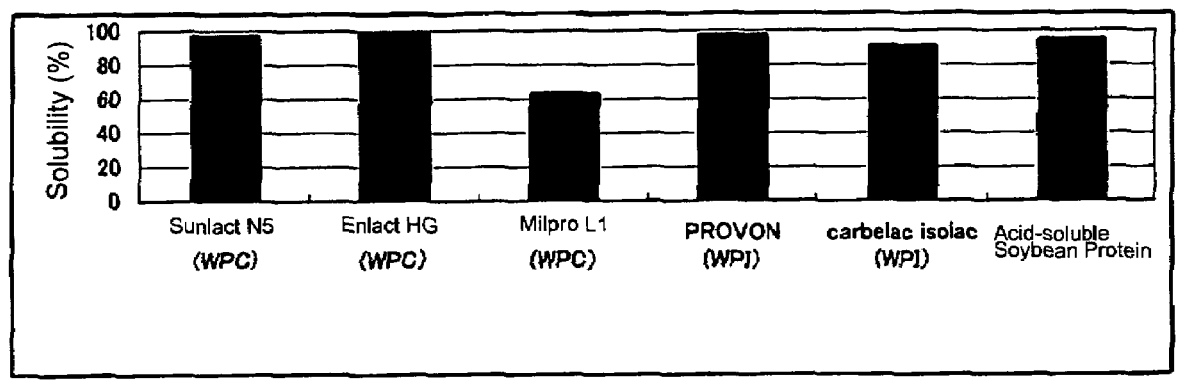
FIG. 3 is a graph showing the solubility of an acid-soluble soybean protein and milk whey proteins.
Figure 4:
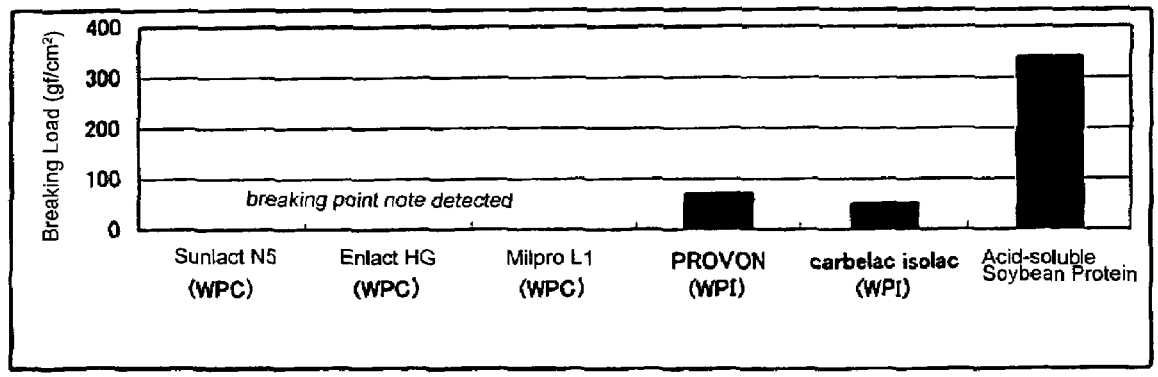
FIG. 4 is a graph showing gel the breaking loads of an acid-soluble soybean protein and milk whey proteins.

The solubility of commercially available milk whey proteins under acid condition and the breaking loads of gels of the proteins were measured. PROVON 190 (Nissei-Kyoeki, Inc.) and Carbelac Isolac (Nissei-Kyoeki, Inc.) as a whey protein isolate (WPI), and Sunlact N5 (Taiyo Kagaku Co., Ltd), Enlact HG (Nippon Shinyaku Co., Ltd) and Milpro L-1 (San-Ei Gen F.F.I., Inc.) as a whey protein concentrate (WPC) were used. A method of preparing a gel and condition for gelation (protein concentration, pH) were the same as the comparatative example 1. The results are shown in FIG. 3 and FIG. 4. The examined soybean proteins except Milpro L-1 had a solubility of 90% or more and were found that they were dissolved similarly to the acid-soluble soybean protein. However, the all WPCs did not gelate. The WPIs gelated. However, the gels of WPIs had a breaking load of 50-70 gf/cm$^2$ and a strain rate of 30-40%, and therefore they were very weak and had unsatisfactory texture compared with the acid-soluble soybean protein gel (breaking load: 340 gf/cm$^2$; strain rate: 69%).

When a solution of PROVON 190 was adjusted to pH 3.0-4.5, it aggregated above pH 3.6 and it gelated at pH 3.6 or less, but the gel was weak and fragile. Even when 200 mM of sodium chloride was added to the solution, the resulting gel was not improved in the breaking load and texture and therefore it remained weak and fragile.

INDUSTRIAL APPLICABILITY

The present invention provides novel acidic gel foods of soybean protein, particularly jelly-like foods whose texture and throat feeling are enjoyable. The gel foods of the present invention are highly nutritious vegetable gel foods comprising a high concentration of soybean protein. In addition, by changing gelation condition, the gel foods having various textures can be obtained.

The invention claimed is:

1. A process for producing acidic gel foods of soybean protein, which comprises heating a 4-20% by weight solution of an acid-soluble soybean protein in water or a mixture of water and alcohol with pH 3.0-4.5, as it is, or after subjecting said solution to any one or more of (A) adjustment of said solution to pH 3.0-4.5, (B) addition of an acid having two or more acid groups in one molecule or a salt thereof, (C) addition of a salt of an acid other than the acid used in (B), and (D) addition of an anionic polymer to form a gel by gelation of the acid-soluble soybean protein, wherein the heating is carried out at 60° C. or more for 10 minutes or more, and wherein the acid-soluble soybean protein is a soybean protein having a solubility of 90% or more at pH 4.5 or lower, which is obtained by subjecting a solution comprising a soybean protein to one or both of (a) removal or inactivation of polyanionic substances, and (b) addition of a polycationic substance.

2. The process for producing acidic gel foods of soybean protein according to claim 1, wherein the amount of the acid or a salt thereof added in (B) is 0.1-10 mM.

3. The process for producing acidic gel foods of soybean protein according to claim 1, wherein the amount of the salt added in (C) is 5-200 mM.

4. The process for producing acidic gel foods of soybean protein according to claim 1, wherein the amount added of the anionic polymer is 2-30% by weight of the amount of the protein.

* * * * *